April 11, 1939.  E. V. COLLINS  2,153,824
AUTOMATIC REVERSIBLE SOIL MOVING MACHINE
Filed Oct. 25, 1937  3 Sheets-Sheet 1
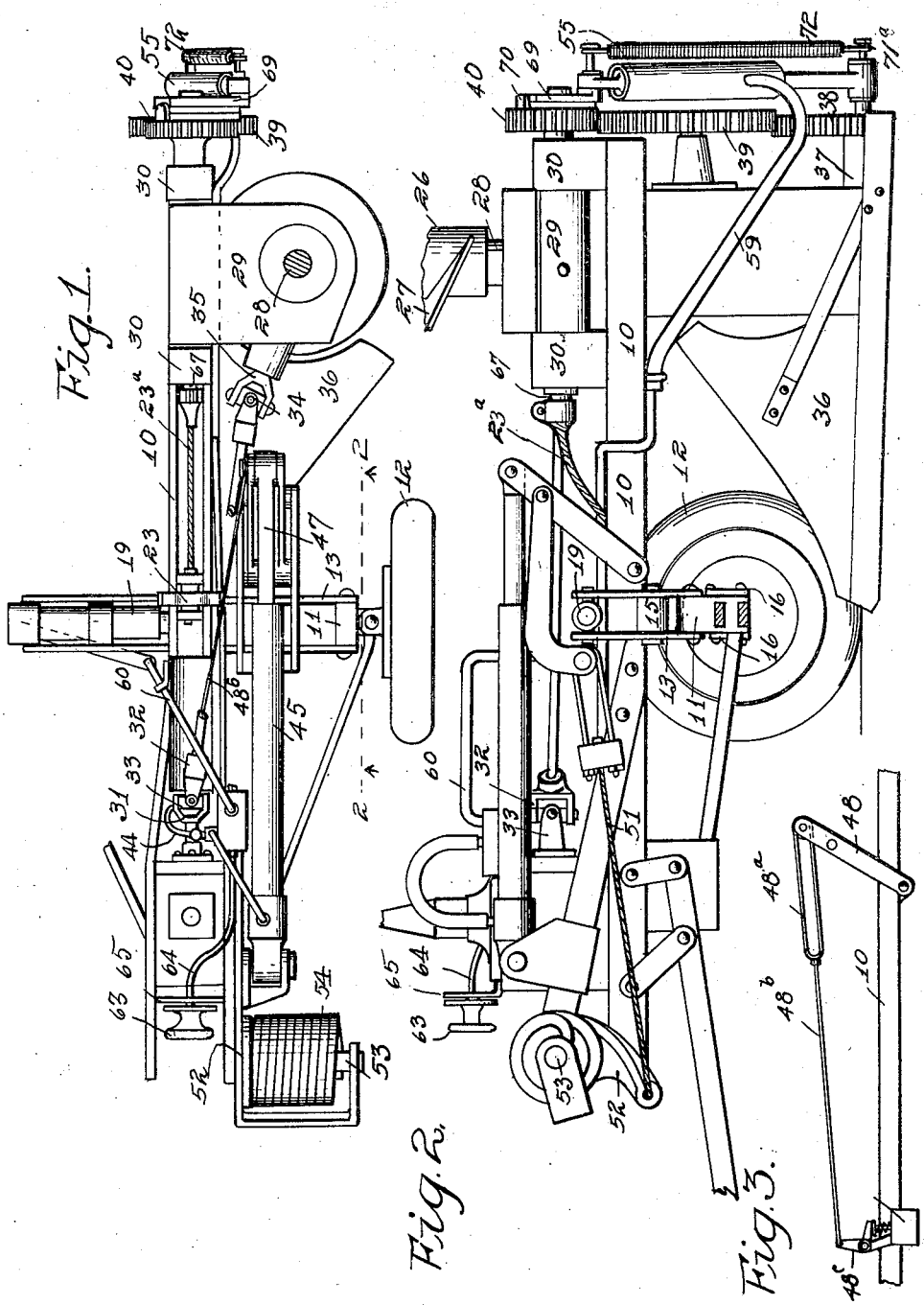
Inventor
Edgar V. Collins

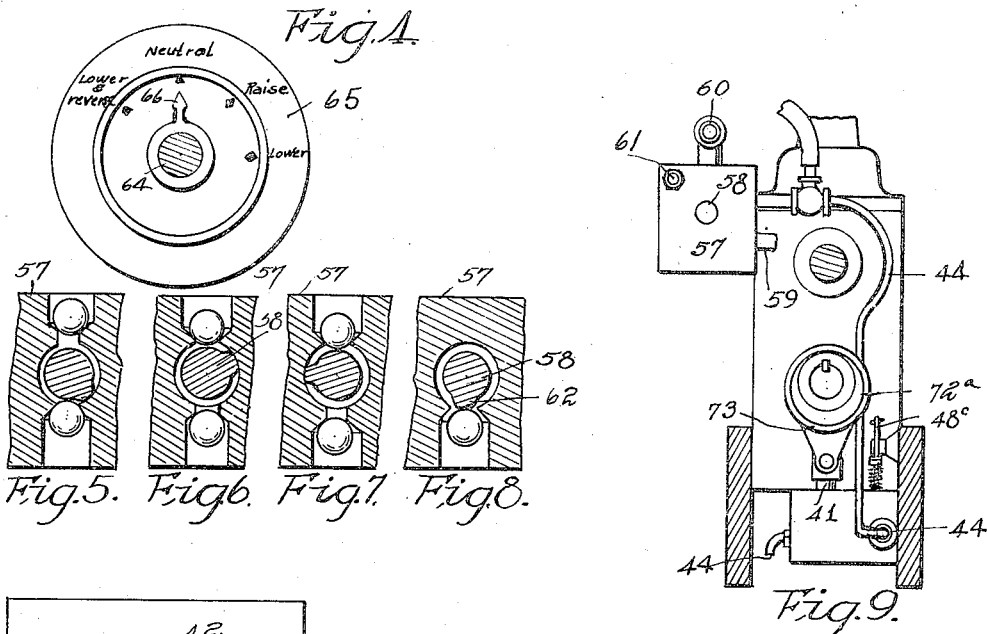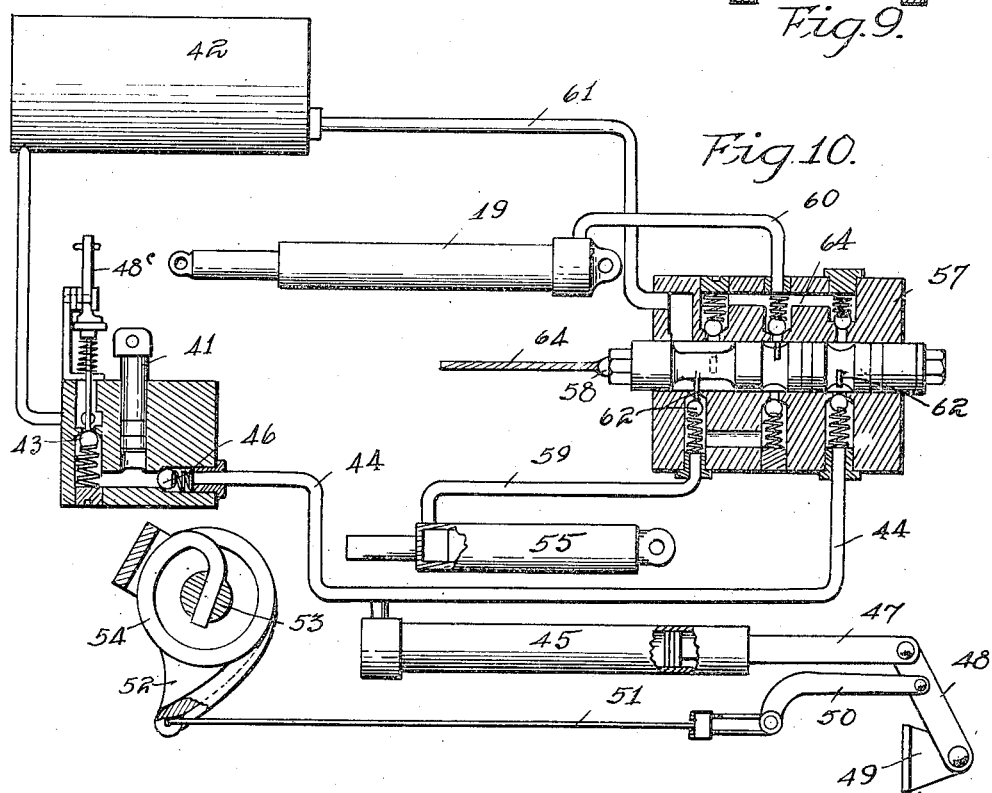

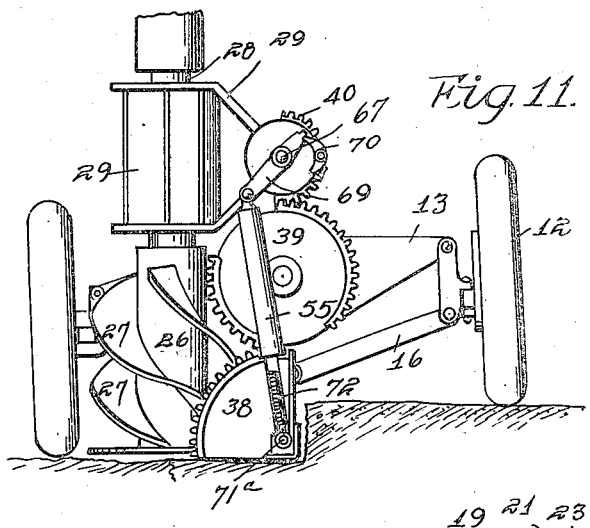
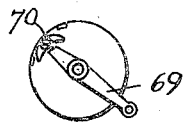
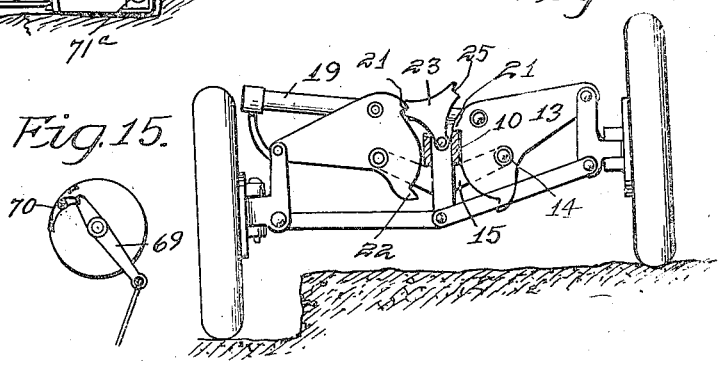
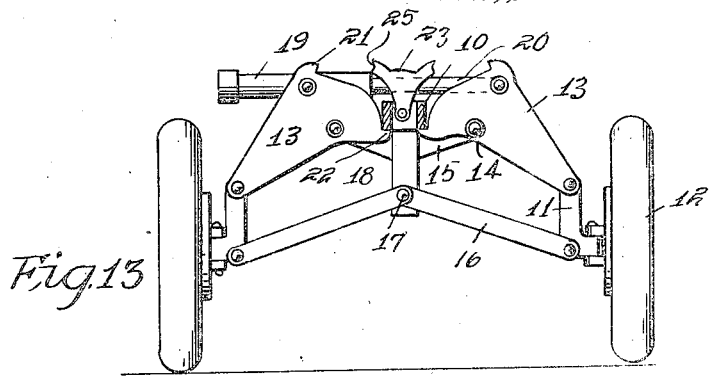
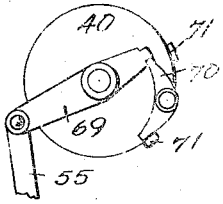

Patented Apr. 11, 1939

2,153,824

UNITED STATES PATENT OFFICE 2,153,824

AUTOMATIC REVERSIBLE SOIL MOVING MACHINE

Edgar V. Collins, Ames, Iowa, assignor, by mesne assignments, to Iowa State College Research Foundation, Ames, Iowa, a corporation of Iowa Application October 25, 1937, Serial No. 170,871

25 Claims. (Cl. 97—32)

Patent No. 2,079,595 on a Reversible soil moving machine was issued to me on May 11, 1937. This machine was characterized by having a frame supported on wheels and carrying a plow and a so-called reversible rotor, and the machine was advanced by a tractor and the rotor was rotated by power from a power take-off from the tractor. In operation a furrow slice from the plow was thrown against the rotor and the rotor threw the entire furrow slice laterally through the air to different distances, controlled by the speed of the rotor, so that terracing for the prevention of soil erosion could be easily, cheaply and quickly accomplished.

In said machine a considerable amount of manual labor was required in reversing the plow and rotor at the end of a furrow, and also considerable manual power was required in raising and lowering the plow relative to the supporting wheels, and these operations also required the operator to get down from the tractor and consumed considerable time by the operator, and in this way the amount of work that could be accomplished by a single operator in a given period was limited.

The object of my present invention is to provide means of simple, durable and inexpensive construction whereby power from the power take-off may be stored during the normal operation of the tractor and said stored power be instantly available to the operator seated upon the tractor, for reversing the plow and rotor and for raising and lowering the plow, thereby avoiding the necessity of the operator getting down from the tractor and manually performing said operations, and also reducing the time and manual labor necessary for such operation in my said prior patent machine.

A further object is to provide means for automatically raising one of the plow frame supporting wheels and lowering the other and giving them the proper inclination when the plow and rotor are reversed.

Referring to the accompanying drawings, Figure 1 shows a top or plan view of my improved reversible terracing machine, one of the supporting wheels being removed.

Figure 2 shows a side elevation of same with the upper portion of one of the rotors broken away, on the dotted line 2—2 of Figure 1.

Figure 3 shows a detail side elevation of the device for automatically relieving the pressure of fluid within the fluid pressure circuit when the pressure has attained a certain predetermined degree.

Figure 4 shows a detail front view of the manually operated control for the various operations of my machine.

Figure 5 shows an enlarged detail sectional view illustrating one of the valve devices in the valve chamber for controlling the flow of fluid.

Figures 6, 7 and 8 show similar views with the various valves arranged in different positions for directing the flow of fluid to the desired rams or points of discharge.

Figure 9 shows a vertical transverse sectional view through a part of the machine frame and illustrating the hydraulic ram assembly operated from a power take-off and the valve chamber.

Figure 10 illustrates diagrammatically the hydraulic ram to be operated by a power take-off, and the various devices actuated by fluid pressure generated by said ram, including the valve mechanism for controlling the flow of fluid to the various actuating rams, and also illustrating the means for storing power to maintain a high pressure upon the fluid within the apparatus.

Figure 11 shows a rear elevation of my improved machine.

Figure 12 shows a vertical transverse sectional view of part of the machine frame and the supporting wheels, with one of the supporting wheels held in position elevated above the other one as required when one of the wheels runs in a furrow.

Figure 13 shows a similar view with the frame elevated relative to the supporting wheels.

Figure 14 shows a detail view illustrating the actuating lever and pawl for effecting a turning over movement of the rotor.

Figure 15 shows a similar view with the actuating lever at the opposite limit of its movement for turning over the rotor in an opposite direction; and Figure 16 shows a similar view illustrating the manner in which the pawl may pass the actuating lever when the turning over movement of the rotor approaches its completion.

Referring to the accompanying drawings, I have used the reference numeral 10 to indicate generally the machine frame, which is preferably long and narrow. This machine frame is mounted upon supporting wheels in such manner that the machine frame may be raised or lowered relative to the supporting wheels or one of the supporting wheels may be raised or lowered relative to the other, for purposes hereinafter made clear. The mechanism for supporting the frame upon the supporting wheels comprises an upright frame member 11 upon which a supporting wheel 12 is rotatably mounted in the ordinary manner. Pivoted to the upper end of each of the upright frame members 11 is a bell crank lever 13. This bell crank lever is fulcrumed at 14 to a part of the machine frame 10, this part being indicated in Figure 12 by the numeral 15. Pivoted to the lower end of each of the upright frame members 11 is a pair of links 16, and these links are pivoted at 17 to a part 18 of the main frame member.

Pivoted to the upper end of one of the bell crank levers above its fulcrum point is a hydraulic ram cylinder 19, the piston of which, 20, is pivoted to the opposite bell crank lever 13. When the piston is fully extended, as shown in Figure 13, the bell crank levers 13 will cause the frame 10 to be elevated to its maximum extent, and when the said hydraulic ram cylinder and piston move toward each other, the frame may move downwardly. This is illustrated in Figure 12 in which the frame is only moved downwardly to a limited extent. In order to permit one of the supporting wheels to move downwardly to a greater extent than the other, I have provided on the bell crank lever 13 a shoulder at 21, and this shoulder will engage part of the frame 10, as shown in Figure 12, and thereby limit the downward movement of the adjacent supporting wheel to which the bell crank lever is connected.

I have also provided a means for limiting the upward movement of the frame relative to the supporting wheels, by providing a shoulder 22 at the lower portion of the bell crank lever to engage the frame member 10 when the upper portion of the bell crank lever is moved to its outer limit, as shown in Figure 13.

In order to provide for lowering one of the supporting wheels relatively lower than the other one I have provided a stop device 23 pivoted to the frame member at 24 and having shoulders 25. When this stop device is thrown to the left, as shown in Figure 12, it will engage the shoulder 21 of the bell crank lever at the left and thereby limit the downward movement of said bell crank lever, and when the stop device is in this position it will not engage the shoulder 21 of the other bell crank lever so that it may move downwardly to its lower limit of movement until its shoulder 21 engages the frame member, as shown in Figure 12.

In connection with the use of wheeled plows it is desirable that when one wheel is to be run in a furrow and the other on a land side, that the wheels be tilted from the vertical in a direction from the land side toward the furrow, and I accomplish this desirable result by arranging the links 16 and the bell crank levers 13 with their pivotal points in such relationship to each other that when one of the bell cranks is in its lower position, as shown at the right in Figure 12, and the other is in its partially raised position, as shown at the left in Figure 12, the supporting wheels will be thus tilted. This inclination of the wheels is shown in Fig. 12.

Mounted upon the rear portion of the main frame is a reversible rotor, indicated generally by the reference numeral 26 and of the class illustrated in my patent before mentioned. The rotor has a series of spiral flights 27, and its main shaft 28 is mounted in a bracket 29, which bracket is mounted in the bearings 30, and the bracket is capable of swinging from position with one of the rotors at the top in upright position, to the other side of the frame 10, with the opposite rotor at the top and in an upright position. For rotating the rotor in either of its said positions I have provided a power take-off device indicated generally by the reference numeral 31, as shown in Figure 1, and designed to be operated by a tractor; and connected with this power take-off device is a driving shaft 32 having a universal joint 33 at one end and another universal joint 34 at the other end to rotate a shaft 35, from which the shaft 28 is driven by mechanism not shown in this application but illustrated in my patent before referred to.

Mounted upon the rear of the machine frame adjacent the said rotor is a reversible plow 36. This plow is mounted upon a shaft 37, and when the said shaft is rotated through an arc of 90° the plow is reversed in position to throw the furrow slice either to the right or to the left. When the plow is reversed it is, of course, necessary that the rotor also be reversed, and for this purpose I have provided on the shaft 37 of the plow a toothed sector 38, and in mesh with this sector is a gear wheel 39 mounted on a stationary support, and fixed to the shaft of the rotor is a toothed sector 40 in mesh with the gear wheel 39. The proportions and arrangement of said gear wheels and toothed sectors are such that, when the plow is reversed and moved through an angle of 90°, then the rotor is moved through an arc of 180°, and when in either position, the furrow slice from the plow will be thrown against the rotor, which is at the lower end of the rotor shaft, and the spiral flights of said rotor will throw the furrow slice laterally in the direction from the side of the plow to which the furrow slice is being directed.

I have provided means whereby the various movements of the plow frame in raising and lowering and the reversal of the plow and rotor may be accomplished instantly by fluid pressure which is readily and easily controlled by an operator seated upon a tractor to which my improved plow is connected. This fluid pressure device is illustrated diagrammatically in Figure 10 and comprises a small hydraulic ram 41 operated from the power take-off of a tractor. The ram is supplied with oil from an oil supply tank 42, and a valve device 43 controls the passage of oil from the tank 42 to the ram. This valve is so arranged that, when open, fluid compressed by the ram 41 will flow upwardly and downwardly from the ram 41 to the tank 42 without increasing the fluid pressure upon the remainder of the hydraulic control mechanism. A pipe 44 leads from the ram 41 to a larger auxiliary ram 45. A one way valve 46 permits the movement of fluid from the ram 41 to the ram 45 in one direction. The piston 47 of the ram 45 is connected to a lever 48 fulcrumed to a support 49, and this lever 48 is connected to a link 50. Attached to the link 50 is a flexible cable 51. A cam-shaped lever 52 is rotatably mounted on a shaft 53 fixed in the machine frame, and the cable 51 is attached to the outer end of this cam-shaped lever. I have provided a convolute power-storing spring 54, one end of which is attached to the shaft 53 and the other end of which is attached to the cam-shaped lever 52, so that as the cable 51 is pulled in one direction, the spring 54 will be wound up and energy stored therein. The arrangement of the cam-shaped lever relative to the cable 51 is of importance for the following reason: When the piston 47 is near its fully extended position, as shown in Figure 10, then the cam-shaped arm is at substantially right angles to the cable, and at this point the maximum amount of energy is stored in the spring, and this energy is instantly available at its maximum for operating the hydraulic apparatus of my machine. When, however, the piston 47 is at its inner limit of movement in the ram 45, the cable rests upon the surface of the cam-shaped lever and is substantially parallel with a major portion of the cam-shaped lever, so that when the piston 47 is at this inner limit of movement and the energy storing spring 54 is at its minimum degree of tension, then the cam-shaped lever, in co-operation with the portion of the cable resting against it, will move the shaft 53 through a relatively greater arc with a minimum of hydraulic pressure upon the piston 47, but as the pressure stored in the spring increases, then the leverage applied by the cam-shaped lever and the cable proportionately increases so that when the cam-shaped lever reaches a position at substantially right angles to the cable, the shaft 53 will move through a shorter arc during a corresponding part of the outward movement of the piston 47.

When the piston 47 is fully extended it is desirable to automatically stop the further pumping of oil by the ram 41. For this purpose I have provided a slotted link 48a (see Fig. 3) slidingly connected with the lever 48. A rod 48b connects the link with a lever 48c, which engages the valve 43 and forces it down to open position, thus permitting fluid from the ram 41 to flow freely back and forth from the ram 41 to the tank 42. In this manner energy from the tractor can be stored relatively slowly and then used suddenly when it is desired to lift the frame or reverse the plow. By means of the energy storing spring a constant pressure is maintained upon the fluid within the cylinder 45. This fluid pressure I have utilized in operating the plow and rotor reversing mechanism, and this is accomplished by the hydraulic ram 55, and this hydraulic pressure is also utilized in operating the plow lifting mechanism, and this is done by means of the hydraulic ram 19.

For the purpose of directing the flow of the liquid under pressure in the manner required for operating the hydraulic rams 55 and 19 in the proper manner, I have provided a valve chamber 57 through which a rotary valve-actuating device 58 is extended. Communicating with this valve chamber is the pipe 44 from the hydraulic ram 45 and a pipe 59 communicating with the ram 55, a pipe 60 communicating with the ram 19, and a return pipe 61 communicating with the storage tank 42. The shaft 58 is provided with a number of cams 62, shown in Figures 5, 6, 7, 8 and 10, and with passageways extending through it and through the valve casings, and in the valve casing there are provided passageways for the fluid. Ball valves control the passageways leading to the shaft 58. These cams, valves and passageways are so constructed and arranged that when the shaft 58 is in one position of its movement, the flow of fluid under pressure from the pipe 44 may pass through the pipe 59 to the hydraulic ram 55, and when in another position of the adjustment of the shaft 58 fluid pressure may pass from the pipe 44 to the pipe 60 of the ram 19, and when in any other position, fluid may pass from the valve casing through the pipe 61 back to the storage tank 42.

The valve chamber 57 with its various valves and passageways and the cams on the shaft 58 for operating the valves are illustrated in various positions in Figs. 5 to 8. This valve arrangement is of ordinary construction and of itself forms no part of my present invention. It is, therefore, unnecessary to describe same in detail as mechanics skilled in this art can readily arrange the cams and valves for the purpose of directing the fluid within the valve chamber to the desired places.

For manually operating the shaft 58 to its various positions for controlling the flow of fluid under pressure I have provided a hand wheel 63 located at the forward part of the machine in position readily accessible to an operator on a tractor drawing the machine. This hand wheel is connected by means of a flexible shaft 64 with the shaft 58. I also preferably provide a dial 65, as shown in Figure 4, and an indicator 66, with directions printed upon the dial indicating the various positions of the shaft 58 relative to the indicator 66. By this means the operator may, by moving the hand wheel 63, adjust the shaft 58 to the desired position and at the same time he may see by the directions upon the dial just what effect will take place when the indicator 66 is moved to any of its various positions. To illustrate: If the indicator 66 is moved to that part of the dial containing the word "Lower", this indicates that the shaft 58 is set to position for permitting the passage of fluid pressure from the lifting ram 19 and when in that position the bell crank levers 13 may move downwardly by gravity and the main supporting frame may also move downwardly, and when the indicator 66 points to the word "Raise" on the dial, this indicates to the operator that fluid pressure is permitted to enter the hydraulic ram 19, which will cause the frame to raise to its upper limit relative to the supporting wheels, and when the indicator points to the word "Reverse" on dial, then fluid pressure is permitted to pass into the ram 55, and by that means operate the rotor and reversing mechanism.

From the foregoing it will be seen that with my improved fluid pressure mechanism power will be taken from the power take-off of a tractor during the ordinary operation of a machine, to actuate the small hydraulic ram 41, and by means of this operation power will be stored in the spring 54, and this power thus stored may be instantly utilized in the reversing ram 55 or the slow raising and lowering ram 19, and further that the power thus stored may be readily and easily controlled by manipulation of the hand wheel 63 conveniently accessible to the operator who may be seated on a tractor drawing the plow.

For the purpose of reversing the plow and rotor by means of power supplied by the ram 55, I have provided the following mechanism: The shaft 67 on which the pinion 40 is fixed is supported by the bracket 29 extended laterally from the rotor and in which the rotor is rotatably mounted. A lever 69 is pivoted to the shaft 67. A pawl 70 is pivoted to the pinion, and its movement is limited by the stops 71 on the pinion 40. The teeth on said pinion 40 are not shown in Figs. 14, 15 and 16. The reversing ram 55 is pivoted to the lever 69, and its piston is pivoted to a pivot pin 71a at the pivotal center of the plow, as shown in Fig. 11. A spring 72 is connected at its upper end to the shaft 67 and at its lower end to the pivot pin 71a.

In operation, and when fluid pressure is applied to the ram 55, the end of the lever 69 attached to the ram 55 will be rapidly elevated and this will cause the lever 69 which is in engagement with the pawl 70 to rapidly rotate the pinion 40 in the direction of the arrow in Fig. 14, thus starting a swinging movement of the rotor on its pivot 67. The weight of the rotor is approximately balanced on the pivot 67, hence, when this swinging movement is thus started, the rotor will be given sufficient momentum to swing to the reversed position. During this swinging movement the pawl 70 will pass the end of the lever 69, as shown in Fig. 16, the pawl being so shaped as to move by gravity to position for permitting said lever to pass. When the rotor has completed its reversing movement the pawl 70 and the lever 69 will be in the position shown in Fig. 15, so that upon another movement of the ram 55 the rotor will be reversed by swinging it in the opposite direction. By means of the gearing devices connecting the rotor and plow both are reversed at the same time by the ram 55.

For driving the small ram 41 I have provided a cam 72a, shown in Fig. 9, on the shaft of the power take-off 31 connected by a yoke 73 with the plunger of the ram 41.

The stop device 23, shown in Figs. 12 and 13, is automatically actuated by means of a flexible cable 23a attached to it and to the shaft 67 on which the rotor is mounted. Hence, each time that the rotor is reversed this stop is also reversed.

In practical operation and assuming that the machine is being advanced over a field surface for forming the first furrow, then the plow frame is adjusted to its downward limit of movement relative to the supporting wheel, because in this instance both supporting wheels will run on land sides or not in the furrow. When the end of the run is reached, the power take-off of the tractor will have pumped enough liquid by means of the ram 41 to store up energy in the spring 54 to its maximum capacity, and during this first passage of the machine the entire furrow slice will be thrown to the right or left toward the terrace to be formed by the rotor. Then the operator may determine whether he will make the return trip on the same side of the furrow to be formed or on the opposite side. In the event that he determines to return on the same side, then the plow and rotor may be reversed by the operator manipulating the dial 63 to the desired point on the indicator plate, and fluid pressure applied to the reversing ram 55 will actuate this rotor and plow reversing movement, and the operator need not move from his seat on the tractor. When this reversing movement is made it is desirable that one of the supporting wheels run in the furrow previously formed, and the other on the land side, and when in this position it is desirable that the supporting wheel that runs in the furrow be elevated relative to the frame, to a greater extent than the supporting wheel which runs on the land side. This is automatically acccomplished by means of the pivoted stop device 23 operatively connected by the flexible shaft 23a connected to the shaft 67 which supports the rotor. In Figure 12 I have illustrated that when the supporting wheels are in said position, their upper ends will be tilted relative to the vertical line in the direction away from the land side. If at any time during the operation of the machine it is desirable to raise or lower the plow relative to its supporting wheels, this may be done by admitting more or less fluid under pressure into the hydraulic ram 19 and maintaining said pressure at the desired point in such manner that the bell crank levers 13 will hold the frame at the desired degree of elevation above the point where the supporting wheels rest upon the ground, and when the hydraulic ram 19 is fully extended to the position shown in Fig. 13 the frame is elevated at its maximum above the ground for purposes of transportation.

When the spring 54 is fully wound up, the operation of the ram 41 is automatically discontinued by the opening of the valve 43 which prevents further pressure being applied to the auxiliary ram 45.

All of the operations, including the reversal of the plow and rotor and the movement of either supporting wheel above the other, or jointly, to the upper or lower limits of movement of the frame relative to the supporting wheels, or the maintenance of a constant pressure in the ram 19 to hold the frame at any given height relative to the supporting wheels, may all be accomplished by the operator upon manipulation of the hand wheel 63 and without the necessity of the operator leaving his seat on the tractor. When the operator reaches the end of any trip across the field he may determine whether or not to return along the same side of the furrow last crossed, or upon the opposite side of the furrow, and he may adjust the rotor and plow, and the relative elevation and arrangement of the frame relative to the supporting wheels, that is to say, the depth of the plow, practically instantly without leaving his seat on the tractor, and by this means a single operator may perform a much greater amount of work in a given time than would be possible without a hydraulic control mechanism.

I claim as my invention:

1. In a machine of the class described, the combination of a frame, supporting wheels therefor, a reversible plow carried by the frame, a hydraulic ram carried by the frame adapted to be operated by a power take-off from a tractor, a spring carried by the frame, means operated by said hydraulic ram for storing power in said spring, means operated by said spring for reversing said plow, and manually operable means for controlling the movements of the spring in reversing the plow.

2. In a machine of the class described, the combination of a frame, supporting wheels therefor, a reversible plow carried by the frame, a hydraulic ram carried by the frame adapted to be operated by a power take-off from a tractor, a spring carried by the frame, means operated by said hydraulic ram for storing power in said spring, means operated by said spring for reversing said plow, manually operable means for controlling the movements of the spring in reversing the plow, and means operated by power from said spring for discontinuing the effective operation of the hydraulic ram when a pre-determined amount of power has been stored in the spring.

3. In a machine of the class described, the combination of a frame, supporting wheels therefor, a reversible plow carried by the frame, a hydraulic ram carried by the frame adapted to be operated by a power take-off from a tractor, means for storing fluid from said ram and for applying pressure to said fluid, means operated by said fluid under pressure for operating the plow reversing mechanism, and a manually controllable valve device for permitting the movement of the fluid to the plow reversing mechanism.

4. In a machine of the class described, the combination of a frame, supporting wheels therefor, a reversible plow carried by the frame, a hydraulic ram carried by the frame adapted to be operated by a power take-off from a tractor, means for storing fluid from said ram and for applying pressure to said fluid, means operated by said fluid under pressure for operating the plow reversing mechanism, means for raising and lowering the plow relative to the supporting wheels by power from the said fluid under pressure, and a manually controllable valve device for selectively permitting the flow of said fluid under pressure to the plow reversing means or to the plow lifting means.

5. In a machine of the class described, the combination of a frame, supporting wheels therefor, a reversible plow carried by the frame, mechanism for reversing the plow, mechanism for raising and lowering the plow relative to the supporting wheels, a hydraulic ram carried by the frame and adapted to be driven by a power take-off from a tractor, a valve casing operatively connected with the hydraulic ram, a hydraulic ram operatively connected with the valve casing and connected with said plow lifting mechanism to operate the lifting mechanism when the lifting ram is operated, a reversing ram operatively connected with the valve casing and connected with the plow reversing mechanism for reversing the plow when the reversing ram is operated, and a manually controllable valve mechanism within said valve casing for selectively permitting the flow of liquid from the valve casing to the lifting ram or the reversing ram.

6. In a machine of the class described, the combination of a frame, supporting wheels therefor, a reversible plow carried by the frame, a hydraulic ram carried by the frame adapted to be operated by a power take-off from a tractor, a spring carried by the frame, means opeated by said hydraulic ram for storing power in said spring, means operated by said spring for reversing said plow, manually operable means for controlling the movements of the spring in reversing the plow, a reversible soil throwing rotor associated with the plow, and means operated upon the reversal of the plow for reversing the rotor.

7. In a machine of the class described, the combination of a frame, supporting wheels therefor, a reversible plow carried by the frame, a hydraulic ram carried by the frame adapted to be operated by a power take-off from a tractor, a spring carried by the frame, means operated by said hydraulic ram for storing power in said spring, means operated by said spring for reversing said plow, manually operable means for controlling the movements of the spring in reversing the plow, means operated by power from said spring for discontinuing the effective operation of the hydraulic ram when a predetermined amount of power has been stored in the spring, a reversible soil throwing rotor associated with the plow, and means operated upon the reversal of the plow for reversing the rotor.

8. In a machine of the class described, the combination of a frame, supporting wheels therefor, a reversible plow carried by the frame, a hydraulic ram carried by the frame adapted to be operated by a power take-off from a tractor, means for storing fluid from said ram and for applying pressure to said fluid, means operated by said fluid under pressure for operating the plow reversing mechanism, a manually controllable valve device for permitting the movement of the fluid to the plow reversing mechanism, a reversible soil throwing rotor associated with the plow, and means operated upon the reversal of the plow for reversing the rotor.

9. In a machine of the class described, the combination of a frame, supporting wheels therefor, a reversible plow carried by the frame, a hydraulic ram carried by the frame adapted to be operated by a power take-off from a tractor, means for storing fluid from said ram and for applying pressure to said fluid, means operated by said fluid under pressure for operating the plow reversing mechanism, means for raising and lowering the plow relative to the supporting wheels by power from the said fluid under pressure, a manually controllable valve device for selectively permitting the flow of said fluid under pressure to the plow reversing means or to the plow lifting means, a reversible soil throwing rotor associated with the plow, and means operated upon the reversal of the plow for reversing the rotor.

10. In a machine of the class described, the combination of a frame, supporting wheels therefor, a reversible plow carried by the frame, mechanism for reversing the plow, mechanism for raising and lowering the plow relative to the supporting wheels, a hydraulic ram carried by the frame and adapted to be driven by a power take-off from a tractor, a valve casing operatively connected with the hydraulic ram, a hydraulic ram operatively connected with the valve casing and connected with said plow lifting mechanism to operate the lifting mechanism when the lifting ram is operated, a reversing ram operatively connected with the valve casing and connected with the plow reversing mechanism for reversing the plow when the reversing ram is operated, a manually controllable valve mechanism within said valve casing for selectively permitting the flow of liquid from the valve casing to the lifting ram or the reversing ram, a reversible soil throwing rotor associated with the plow, and means operated upon the reversal of the plow for reversing the rotor.

11. In a machine of the class described, the combination of a frame, supporting wheels therefor, a reversible plow carried by the frame, mechanism for reversing the plow, mechanism for raising and lowering the plow relative to the supporting wheels, a hydraulic ram carried by the frame and adapted to be driven by a power take-off from a tractor, a valve casing operatively connected with the hydraulic ram, a hydraulic ram operatively connected with the valve casing and connected with said plow lifting mechanism to operate the lifting mechanism when the lifting ram is operated, a reversing ram operatively connected with the valve casing and connected with the plow reversing mechanism for reversing the plow when the reversing ram is operated, a manually controllable valve mechanism within said valve casing for selectively permitting the flow of liquid from the valve casing to the lifting ram or the reversing ram, a reversible soil throwing rotor pivotally mounted on the frame for movement from an upright position with one end at the top, to an upright position with the other end at the top, and means operated upon the reversal of the plow for reversing the rotor from one of said positions to the other.

12. In a machine of the class described, the combination of a hydraulic ram, an energy storing ram operatively connected therewith, a cable attached to the energy storing ram, a rotatable shaft, a cam-shaped lever fixed to the shaft and having said cable fixed to the outer end and in position to rest against said cam-shaped lever during a part of the rotation of the shaft, and a convolute, energy storing spring having one end fixed to said shaft and the other end fixed to a stationary support, the arrangement of the cam-shaped lever relative to the spring and cable being such that the leverage applied by the cam-shaped lever to the spring gradually increases as the spring is being wound up and reaches its maximum length of leverage when the spring is wound up to its maximum.

13. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, a hydraulic ram pivoted to one of said bell crank levers above its fulcrum and having a piston pivoted to the other bell crank lever for elevating the frame relative to the supporting wheels as the piston is moved outwardly and for lowering the frame as the piston is moved inwardly, and means for supplying fluid under pressure to said ram.

14. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, a hydraulic ram pivoted to one of said bell crank levers above its fulcrum and having a piston pivoted to the other bell crank lever for elevating the frame relative to the supporting wheels as the piston is moved outwardly and for lowering the frame as the piston is moved inwardly, means for supplying fluid under pressure to said ram, and means for limiting the upward movement of the frame relative to the supporting wheels.

15. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, a hydraulic ram pivoted to one of said bell crank levers above its fulcrum and having a piston pivoted to the other bell crank lever for elevating the frame relative to the supporting wheels as the piston is moved outwardly and for lowering the frame as the piston is moved inwardly, means for supplying fluid under pressure to said ram, means for limiting the upward movement of the frame relative to the supporting wheels, and means for limiting the downward movement of the frame relative to the supporting wheels.

16. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, a hydraulic ram pivoted to one of said bell crank levers above its fulcrum and having a piston pivoted to the other bell crank lever for elevating the frame relative to the supporting wheels as the piston is moved outwardly and for lowering the frame as the piston is moved inwardly, means for supplying fluid under pressure to said ram, and means for selectively limiting the downward movement of either one of said bell crank levers while permitting the other bell crank lever to move downwardly to a greater extent to thereby adapt the machine for use with either wheel in a furrow.

17. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, a hydraulic ram pivoted to one of said bell crank levers above its fulcrum and having a piston pivoted to the other bell crank lever for elevating the frame relative to the supporting wheels as the piston is moved outwardly and for lowering the frame as the piston is moved inwardly, means for supplying fluid under pressure to said ram, and means for selectively limiting the downward movement of either one of said bell crank levers while permitting the other bell crank lever to move downwardly to a greater extent to thereby adapt the machine for use with either wheel in a furrow, said means comprising a stop plate pivoted to the frame and so positioned that when at one limit of its movement it will be engaged by one of the bell crank levers and limit its downward movement, and when at its other limit of movement it will be engaged by the other bell crank lever and limit its downward movement.

18. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, a hydraulic ram pivoted to one of said bell crank levers above its fulcrum and having a piston pivoted to the other bell crank lever for elevating the frame relative to the supporting wheels as the piston is moved outwardly and for lowering the frame as the piston is moved inwardly, and means for supplying fluid under pressure to said ram, said bell crank levers each being formed with two shoulders to engage portions of the machine frame for limiting the pivotal movement of the bell crank levers relative to the supporting wheels.

19. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, a hydraulic ram pivoted to one of said bell crank levers above its fulcrum and having a piston pivoted to the other bell crank lever for elevating the frame relative to the supporting wheels as the piston is moved outwardly and for lowering the frame as the piston is moved inwardly, and means for supplying fluid under pressure to said ram, the pivotal arrangement of said links relative to that of said bell crank lever being such that as one of said bell crank levers is in its fully lowered position and the other in a partially lowered position the supporting wheels will be tilted from vertical position.

20. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, and means for moving the inner ends of said bell crank levers beyond their fulcrum points upwardly and downwardly to thereby raise and lower the frame relative to the supporting wheels.

21. In a machine of the class described, the combination of a frame, supporting wheels therefor, a reversible plow carried by the frame, a reversible soil throwing rotor pivoted to the frame to swing from an upright position at one side of the plow, to an upright position at the other side of the plow, gearing devices connecting the plow and rotor for reversing the plow when the rotor is swung from one of its positions to the other, and a hydraulic ram connected to the frame and to the rotor in such manner that when extended it will swing the rotor from either one of said positions to the other.

22. In a machine of the class described, the combination of a frame, supporting wheels therefor, a reversible plow carried by the frame, a reversible soil throwing rotor pivoted to the frame to swing from an upright position at one side of the plow, to an upright position at the other side of the plow, gearing devices connecting the plow and rotor for reversing the plow when the rotor is swung from one of its positions to the other, a hydraulic ram connected to the frame, a lever connected to the other end of the ram and fulcrumed to the pivotal support of the rotor, and a pawl carried by the said gearing member attached to the rotor in position to be engaged by said lever and swing the rotor in the direction for starting its reversal movement, said pawl being so shaped and positioned that as the rotor continues its swinging movement the pawl may freely pass said lever and move to position to be again engaged by said lever when the rotor is swung in an opposite direction.

23. In a machine of the class described, the combination of a frame, supporting wheels therefor, a reversible plow carried by the frame, a reversible soil throwing rotor pivoted to the frame to swing from an upright position at one side of the plow, to an upright position at the other side of the plow, gearing devices connecting the plow and rotor for reversing the plow when the rotor is swung from one of its positions to the other, a hydraulic ram connected to the frame, a lever connected to the other end of the ram and fulcrumed to the pivotal support of the rotor, a pawl carried by the said gearing member attached to the rotor in position to be engaged by said lever and swing the rotor in the direction for starting its reversal movement, said pawl being so shaped and positioned that as the rotor continues its swinging movement the pawl may freely pass said lever and move to position to be again engaged by said lever when the rotor is swung in an opposite direction, and a spring connected to the movable member of the hydraulic ram for applying tension thereto to discharge fluid from the ram and to return the ram to starting position after each rotor reversing operation of the ram.

24. In a machine of the class described, the combination of a frame, supporting wheels for the frame, a reversible plow carried by the frame, a reversible rotor carried by the frame, means for relatively raising either supporting wheel on the side of the machine in which the wheel is to be run in a furrow, means for reversing the position of the plow and the rotor, and means automatically operated upon a reversal of the plow and rotor for relatively lowering the wheel on the land side.

25. In a machine of the class described, the combination of a frame, a plow carried by the frame, two upright wheel supporting members, a supporting wheel mounted on each, a bell crank lever pivoted to the upper portion of each of said wheel supporting members extended toward each other and fulcrumed to the frame, links pivoted to the lower portions of said wheel supporting members and extended inwardly towards the longitudinal center of the machine and pivoted to the frame, a hydraulic ram pivoted to one of said bell crank levers above its fulcrum and having a piston pivoted to the other bell crank lever for elevating the frame relative to the supporting wheels as the piston is moved outwardly and for lowering the frame as the piston is moved inwardly, means for supplying fluid under pressure to said ram, means for selectively limiting the downward movement of either one of said bell crank levers while permitting the other bell crank lever to move downwardly to a greater extent to thereby adapt the machine for use with either wheel in a furrow, said means comprising a stop plate pivoted to the frame and so positioned that when at one limit of its movement it will be engaged by one of the bell crank levers and limit its downward movement, and when at its other limit of movement it will be engaged by the other bell crank lever and limit its downward movement, and a flexible shaft operatively connected at one end to the reversible plow so that as the plow is being reversed the flexible shaft will be partially rotated, said flexible shaft at its other end being attached to said pivoted stop device, to thereby swing it to the position for permitting one of the supporting wheels to move relatively further down than the other.

EDGAR V. COLLINS.